US005842219A

United States Patent [19]

High, Jr. et al.

[11] Patent Number: 5,842,219
[45] Date of Patent: Nov. 24, 1998

[54] METHOD AND SYSTEM FOR PROVIDING A MULTIPLE PROPERTY SEARCHING CAPABILITY WITHIN AN OBJECT-ORIENTED DISTRIBUTED COMPUTING NETWORK

[75] Inventors: Robert Howard High, Jr., Round Rock; Vinoj Narayan Kumar, Austin, both of Tex.

[73] Assignee: International Business Machines Corporation, Armonk, N.Y.

[21] Appl. No.: 616,115

[22] Filed: Mar. 14, 1996

[51] Int. Cl.$^6$ ....................................................... G06F 17/30
[52] U.S. Cl. .................................. 707/103; 707/3; 707/4; 707/2
[58] Field of Search .................................. 707/103, 1, 3, 707/4, 2

[56] References Cited

U.S. PATENT DOCUMENTS

| | | | |
|---|---|---|---|
| 5,142,674 | 8/1992 | Barker et al. | 707/10 |
| 5,355,497 | 10/1994 | Cohen-Levey | 395/700 |
| 5,506,983 | 4/1996 | Atkinson et al. | 707/1 |
| 5,506,984 | 4/1996 | Miller | 707/10 |
| 5,574,901 | 11/1996 | Takahashi | 707/1 |
| 5,680,003 | 10/1997 | Peltonen et al. | 395/793 |
| 5,717,924 | 2/1998 | Kawai | 707/102 |

Primary Examiner—Thomas G. Black
Assistant Examiner—Greta L. Robinson
Attorney, Agent, or Firm—David A. Mims, Jr.; Antony P. Ng; Andrew J. Dillon

[57] ABSTRACT

A method and system for providing a multiple property search capability within an object-oriented distributed computing network are disclosed. In accordance with the method and system of the present invention, a permanent index which includes multiple property names is initially built. Next, a search expression, which includes at least one property name, is traversed in order to form a property name list. The property name list includes all of the property names which are specified within the search expression. After comparing the property name list with the permanent index, any of the specified property names which also exist in the permanent index is removed from the property name list. Thereafter, a determination is made as to whether or not there is any property name still remaining on the property name list. If there is at least one property name still remaining on the property list, a temporary index which includes all remaining property names is built, such that subsequent searches for frequently searched properties can be performed more efficiently by utilizing both the permanent index and the temporary index.

19 Claims, 4 Drawing Sheets

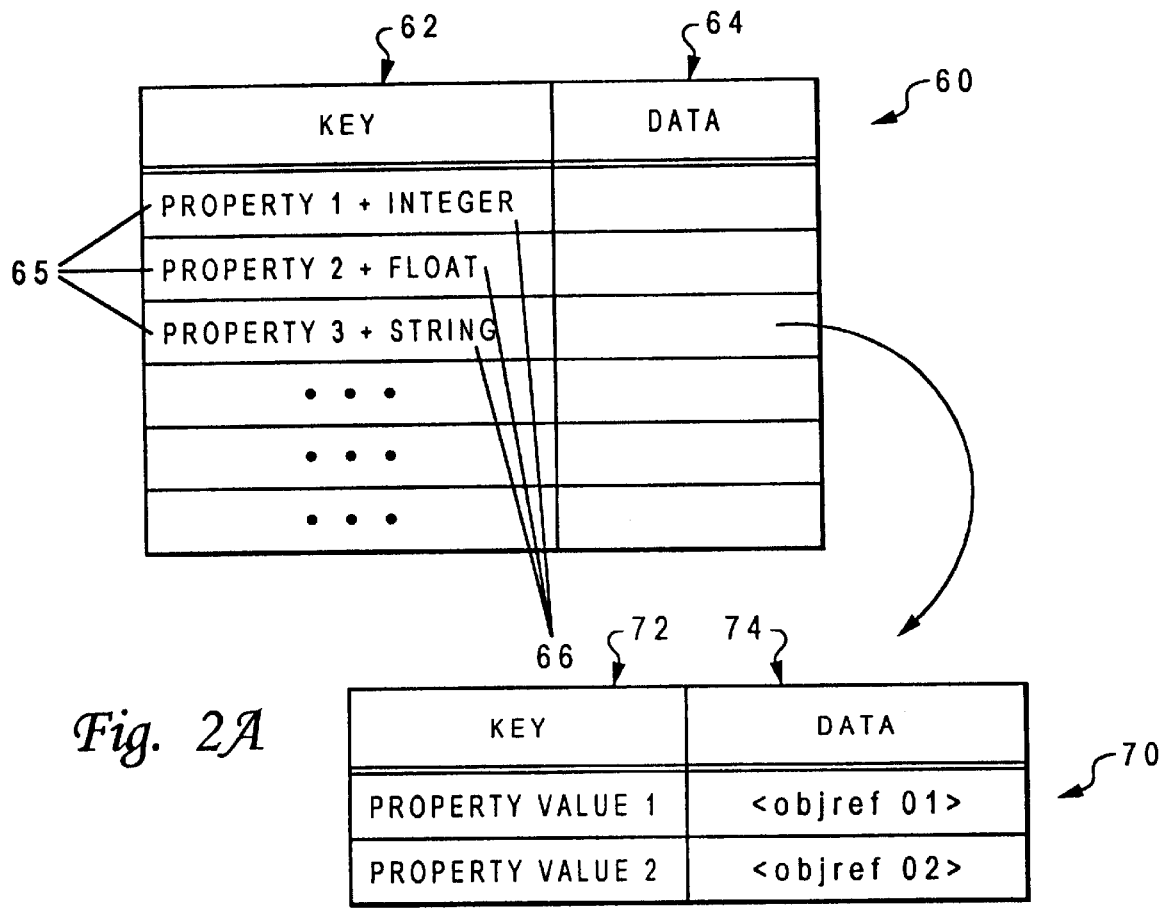

Fig. 2A

```
/* Structure of Temporary Index */                         ⸺80
typedef sequence < CosNaming :: Name > Names ;
struct ValueIndexComponent {
      any value ;              /* property value */
      Names names ;
} ;

Typedef sequence < ValueIndexComponent > ValueIndex ;
struct PropNameIndexComponent {
    string property-name ;
    TC kind property-type ;
    ValueIndex values ;

} ;

typedef sequence < PropNameIndexComponent > PropNameIndex ;
```

Fig. 2B

METHOD AND SYSTEM FOR PROVIDING A MULTIPLE PROPERTY SEARCHING CAPABILITY WITHIN AN OBJECT-ORIENTED DISTRIBUTED COMPUTING NETWORK

BACKGROUND OF THE INVENTION

1. Technical Field

The present invention relates to a method and system for data processing in general, and in particular to a method for providing an enhanced searching capability within a distributed computing network. Still more particularly, the present invention relates to a method for providing a multiple property searching capability within an object-oriented distributed computing network.

2. Description of the Prior Art

Object Management Group (OMG) is a consortium of companies with over 500 members having a primary goal of creating an open object infrastructure for a distributed computing environment. Since 1989, the OMG has been busily defining a global bus called Common Object Request Broker Architecture (CORBA™) for such open object infrastructure. This CORBA™ object bus defines the standard and interoperation of the components that exist within a distributed computing environment under the open object infrastructure.

OMG has enjoyed some initial success, and at this point there are already several CORBA™ 1.2 compliant object broker products existing on the market, such as SOM™ by International Business Machines Corporation, ORB Plus™ by Hewlett Packard, Inc., and ObjectBroker™ by Digital Equipment Corporation. CORBA™ 2.0 specification was subsequently adopted in December 1994. With CORBA™ 2.0, an object request broker (ORB) can broker interactions among objects that reside locally within a single computer as well as among objects that globally interact across multivendor ORBs and operating systems. Hence, it is expected that more distributed components will be able to take advantage of this interoperabilty, and the size of the distributed computing network can be truly expanded under CORBA™ 2.0.

An ORB is a "middleware" that establishes the client/server relationships between objects. Thus, under an ORB, a client object can transparently invoke a method on a server object, which can be on the same computer or on a computer located across a distributed computing network. The client object does not have to be aware of the location, the programming language, or even the operating system of the server object. Further, objects on the ORB can act as either a client or a server, depending on the occasion. Like a telephone exchange for a telephone network, the ORB provides the basic mechanism for brokering requests among objects within a distributed computing environment.

Of all the services within the ORB, Naming Service is probably considered as the most basic service because, typically, it must be invoked in order to support other services on the ORB. As defined, the Naming Service is the principal mechanism by which objects on an ORB locate other objects. The Naming Service can navigate through different naming-context trees in search of the particular object the client object desires. In essence, the Naming Service is like the telephone "white pages" for a distributed computing network, such that objects within the network can be found by their respective names.

By extending the telephone directory analogy one step further, a telephone "yellow pages" may also be added to the basic Naming Service capability to allow a client object to create a name-to-object association (known as name binding) with selected properties. "Properties" are defined as a name-value pair. With the "yellow pages" feature added to the Naming Service, a client object can search through all the namespaces to obtain one or multiple object references which satisfy a specific search constraint. An example of a search constraint within a search expression is shown as follows:

"item=='speaker' AND frequency==50 Hz OR price<500"

A search initiated with the above example will return all name bindings that fully satisfy the search constraint of a 50 Hz speaker having a price of less than $500. Because such a search constraint may involve searching multiple namespaces over a wide area of the distributed computing network, performance tends to become an important factor. Consequently, it would be desirable to provide an enhanced multiple property searching capability within an object-oriented distributed computing network such that this type of multiple property search can be performed more efficiently.

SUMMARY OF THE INVENTION

In view of the foregoing, it is therefore an object of the present invention to provide an improved method and system for data processing.

It is another object of the present invention to provide an improved method and system for providing an improved search capability within a distributed computing network.

It is yet another object of the present invention to provide an improved method and system for providing a multiple property search capability within an object-oriented distributed computing network.

In accordance with the method and system of the present invention, a permanent index which includes multiple property names is initially built. Next, a search expression, which includes at least one property name, is traversed in order to form a property name list. The property name list includes all of the property names which are specified within the search expression. After comparing the property name list with the permanent index, any of the specified property names which also exist in the permanent index is removed from the property name list. Thereafter, a determination is made as to whether or not there is any property name still remaining on the property name list. If there is at least one property name still remaining on the property list, a temporary index which includes all remaining property names is built, such that subsequent searches for frequently searched properties can be performed more efficiently by utilizing both the permanent index and the temporary index.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 2A is a graphic representation of a permanent index constructed in accordance with to a preferred embodiment of the present invention;

FIG. 2B is a high-level code representation of the structure of a temporary index created in accordance with a preferred embodiment of the present invention;

DETAILED DESCRIPTION OF PREFERRED EMBODIMENT

The present invention may be applicable to a variety of distributed computing networks, such as a local area network (LAN) or a wide area network (WAN), under a number of different operating systems. The computers within the distributed computing networks may be personal computers, mini-computers, or mainframe computers. For the purpose of illustration, a preferred embodiment of the present invention, as described below, is implemented in the SOM Objects™ product series manufactured by International Business Machines Corporation.

Figure 1:
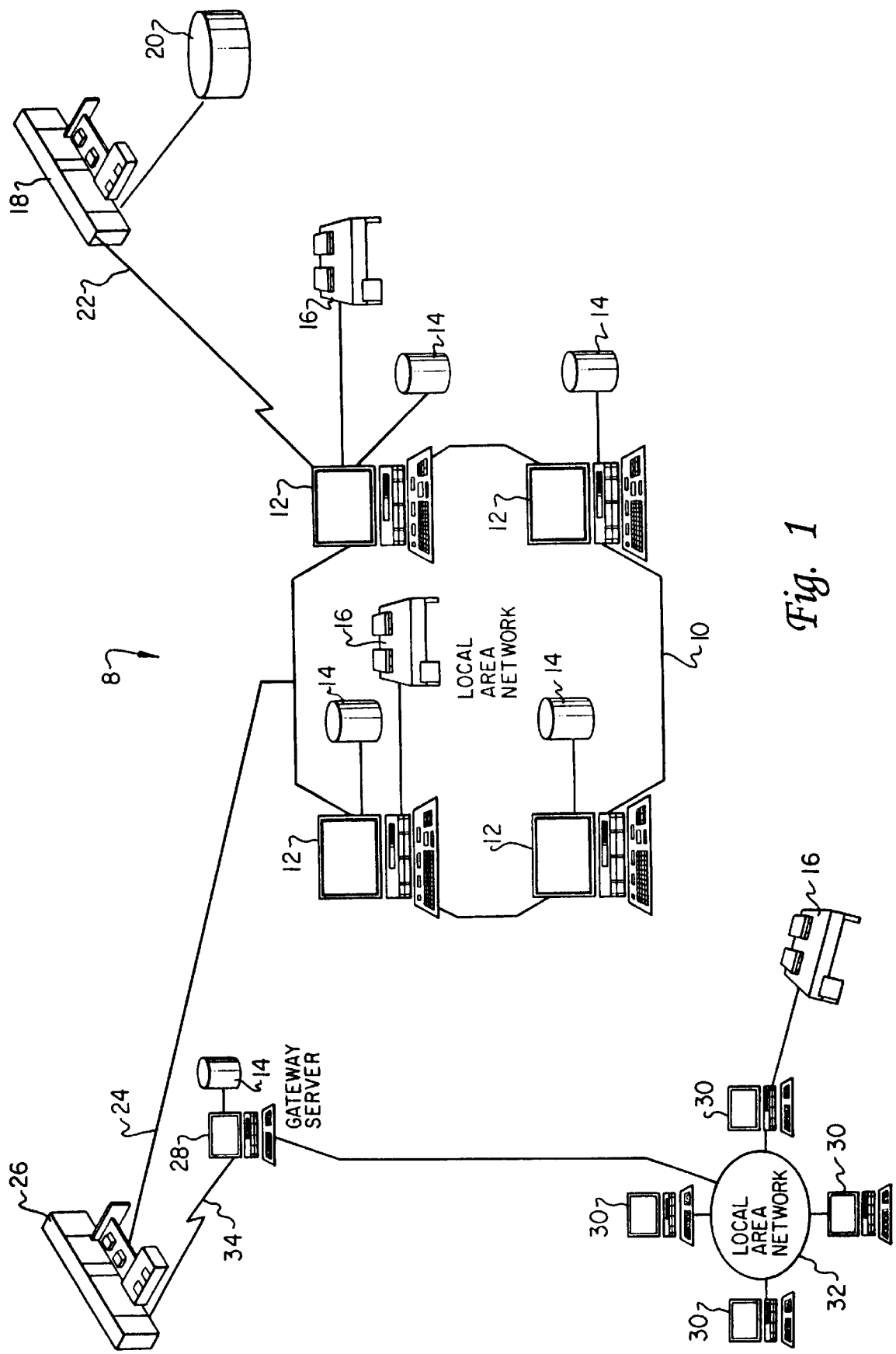
FIG. 1 is a pictorial representation of a distributed computing network which may be utilized to implement the method and system of the present invention.

Referring now to the drawings and in particular to FIG. 1, there is depicted a pictorial representation of a distributed computing network 8 which may be utilized to implement the method and system of the present invention. As may be seen, distributed computing network 8 may include a plurality of local networks, such as LANs 10 and 32, each of which preferably includes a plurality of computers 12 and 30, respectively. Of course, those skilled in the art will appreciate that a plurality of Intelligent Work Stations (IWSs) coupled to a host processor may also be utilized for each of LANs 10 and 32.

As shown in FIG. 1, each computer 12, 30 may be coupled to a storage device 14 and/or an output device 16. One or more of storage devices 14 may be utilized to store various data objects which may be periodically accessed and processed by a client object within distributed computing network 8, in accordance with the method and system of the present invention. In a manner well known in the prior art, each of such data objects may be stored within a storage device 14 which is associated with a Resource Manager or Library Service responsible for maintaining and updating all resource objects associated therewith.

Still referring to FIG. 1, distributed computing network 8 may also include several mainframe computers, such as mainframe computer 18 and mainframe computer 26. Mainframe computer 18 is preferably coupled to LAN 10 by means of communications link 22. Mainframe computer 18 is also coupled to a storage device 20 which may serve as a remote storage for LAN 10. LAN 32 is coupled to LAN 10 via gateway server 28, communications link 34 and mainframe computer 26 which serves as a communications controller. Gateway server 28 may be a computer or an Intelligent Work Station.

Mainframe computer 18 may be situated in a location that is very far from LAN 10. Similarly, LAN 10 may be situated in a location that is also very far from LAN 32. For example, LAN 32 may be located in California while LAN 10 may be located within Texas, and mainframe computer 18 may be located in New York. As discussed above, with respect to LAN 32 and LAN 10, a plurality of data objects may be stored within storage device 20 and controlled by mainframe computer 18, as Resource Manager or Library Service.

This invention preferably builds and operates on two types of indices-a Permanent Index and a Temporary Index. The structure of a temporary index is quite similar to that of a permanent index, though, there are also several differences between the temporary index and the permanent index. One difference is that the lifetime of a temporary index is the same as the lifetime of a process which creates it, while a permanent index exists beyond the lifetime of a process that creates it. Further, temporary indices are preferably stored within a system memory of a computer in which the local Naming Service resides, while permanent indices are preferably stored within a disk unit of the computer in which the local Naming Service resides.

With reference now to FIG. 2A, there is illustrated a graphical representation of a permanent index constructed in accordance with a preferred embodiment of the present invention. Permanent index 60 comprises a key column 62 and a data column 64. Each entry of key column 62 further comprises a property name 65 and a property type 66. Property name 65 is a name assigned to the property while property type 66 may be any CORBA™ type. On the other hand, each entry of data column 64 comprises some data that correspond to a respective entry in key column 62. If there is more than one level of data in an entry within data column 64, then that entry may contain a pointer that points to another index table 70 which contains more than one level of data.

The structure of index table 70 is quite similar to that of permanent index 60. Index table 70 comprises key column 72 and data column 74. In the case of index table 70, each entry of key column 72 comprises all the property values within the distributed computing network that are associated to a property name entry in key column 62 of permanent index 60. Incidentally, each entry of data column 74 contains a reference to an owning object that is undoubtedly corresponded to each entry in key column 72. It is understood that more than one entry in data column 64 of permanent index 60 may point to a separate index table, each preferably having a structure identical to index table 70, such that several different index tables 70 may correspond to one permanent index 60.

With reference now to FIG. 2B, there is illustrated a high-level code representation of a structure of a temporary index 80 in CORBA™ IDL programming language created in accordance with a preferred embodiment of the invention. As mentioned above, the structure of temporary index 80 is similar to that of permanent index 60, except that temporary index 80 is stored in a system memory and permanent index 60 is stored in a disk unit. In addition, permanent index 60 is preferably a database file that is created as a binary tree (B-tree) within the disk unit.

Figure 3:
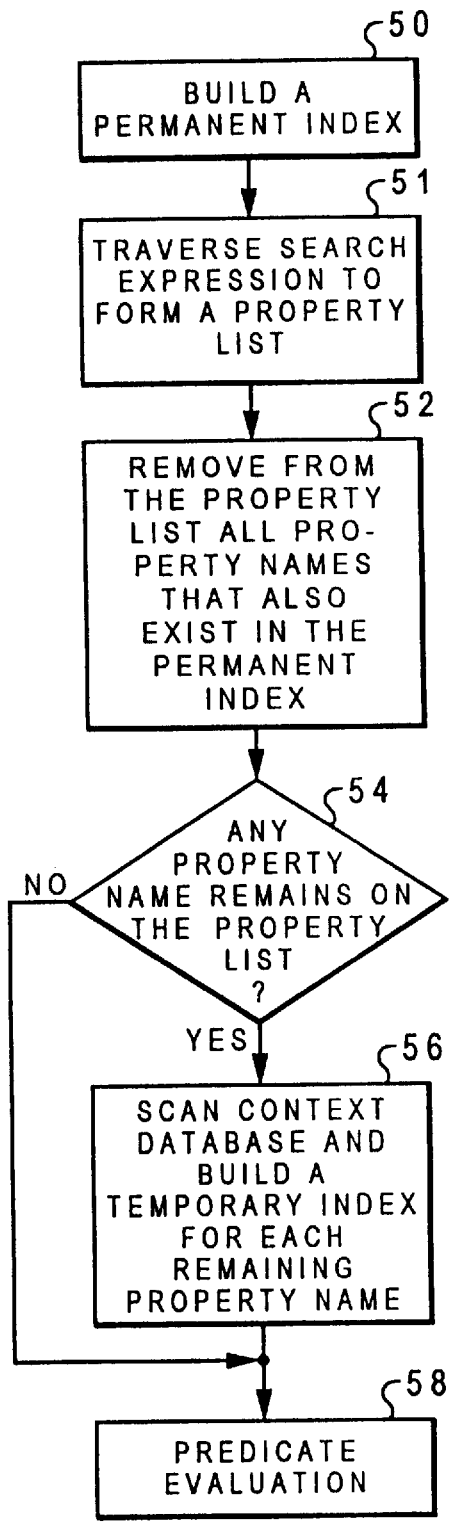
FIG. 3 is a high-level logic flow diagram of the method for providing a multiple property search capability within an object oriented distributed computing network, in accordance with a preferred embodiment of the present invention.

Referring now to FIG. 3, there is illustrated a high-level logic flow diagram of the method for providing a multiple property search capability within an object-oriented distributed computing network, in accordance with a preferred embodiment of the present invention. Starting at block 50, a permanent index is initially built with a limited number of property names and their corresponding property values. At block 51, a search expression, which includes at least one search constraint (or at least one property name), is first traversed in order to form a property name list. It is understood by those who are skilled in the art that the search expression has been parsed and reformed into an expression tree before the traversing can be taken place. At this point, the property name list includes all the property names extracted from the search expression.

After comparing the property name list with the permanent index, all the property names that co-exist in the permanent index are removed from the property name list, at block 52. At block 54, a determination is made as to whether or not there is any property name still remaining on the property name list. If there is a property name still remaining on the property name list, then, at block 56, the entire context database within the distributed computing network is scanned and a temporary index is built to include all the property names that are still remaining on the property list. Otherwise, if there is no property name remaining on the property name list, then the scanning of the context database may be avoided and the process proceeds to block 58. Finally, a predicate evaluation is performed at block 58.

In addition, after the temporary index is built, the property name list must be compared with the temporary index in order to remove the coexisting property names from the property name list, at block 52. The new temporary list that is built at block 56 is subsequently appended to the existing temporary index.

The predicate evaluation is performed by operating directly on both permanent index 60 and temporary index 80. Most search engines will utilize a stack to implement a calculator. Whenever a property name gets pushed onto a stack, the property name actually refers to an index. Hence, this operation is utilized (along with any corresponding values) to obtain a binding list—that is, a list of binding identifiers that satisfy the sub-expression. The following semantics are utilized for performing the predicate evaluation:

1. Whenever an operation is performed on a property name, the result returns another index which is a copy of the original. The resulting index is pushed onto the stack.
2. Comparison operations (such as ==, !=, <, <=, >, and >=) produce a sub-index which only contains those bindings that satisfy the expression.
3. Logical operations (such as AND, XOR, and OR) produce a new index that is the intersection, non-intersection, or union of the original two indices.
4. Set operations produce a new index that is a subset of the original index of which the entries are contained in a value-list. By the time an index gets put on the stack, it is thereafter a de-referenced link (e.g., binding list) with no specific relationship to a particular property name.

EXAMPLE

Semantics of mapping operators to indices:
1. index (A)+index (B) means a set union (mapped to oper +)
2. index (A)−index (B) means all elements in A that are not in B (non-intersection)
3. value==index (A) means all elements in A that satisfy 'value' (intersection)
4. index (A)<index (B) means cross product between A and B
5. index (A)+−1: The property value is included in the index and the arithmetic operation is performed on the temporary value. However, any change to the original value will invalidate the index for use anywhere else in the expression. Therefore the index should be a copy of the original for use solely within the sub-expression.

Figure 4A:
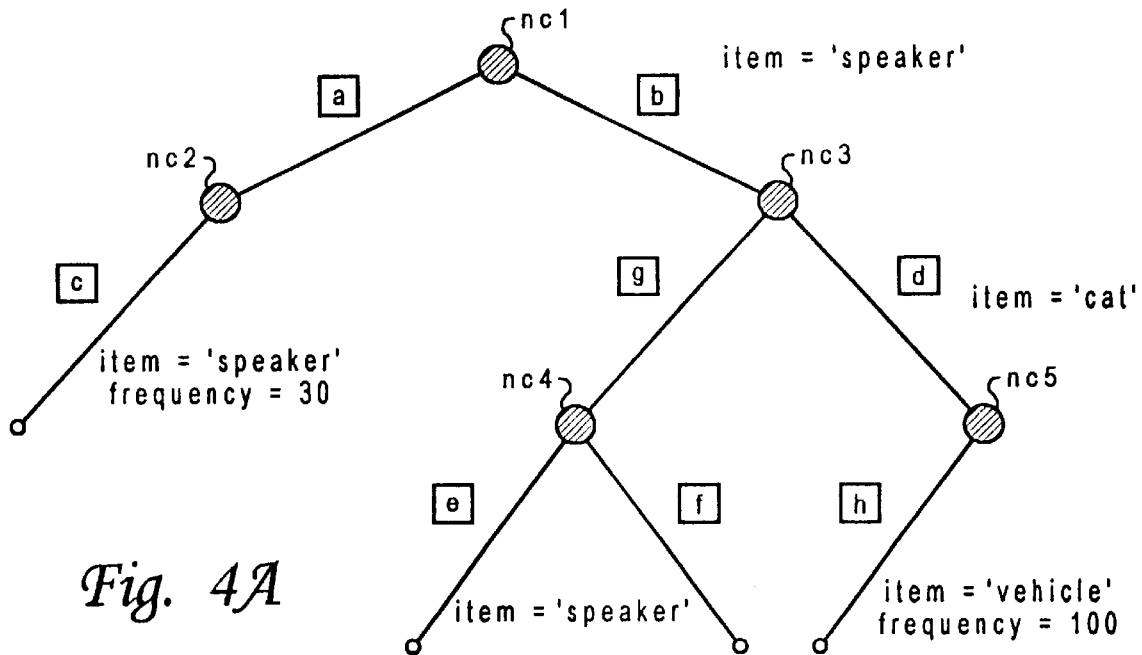
FIG. 4A is a graphical depiction of a hierarchical naming tree which may be utilized to illustrate the present invention.

Referring now to FIG. 4A, there is depicted a graphical depiction of a hierarchical naming tree which may be utilized to illustrate the present invention. As shown, each dark circle represents a node; nc1 is the root node and nc2, nc3, nc4 and nc5 are sub-nodes. Further, a, b, c, d, e, f, g, and h are the name bindings. In this example, "item" is a property name while "speaker," "cat," and "vehicle" are the corresponding property values. Similarly, "frequency" is a property name while 30 and 100 are the corresponding property values. Thus, a search for "item=='speaker'" at node nc1 would return the binding names: "a;c," "b," and "b;g;e."

Figure 4B:
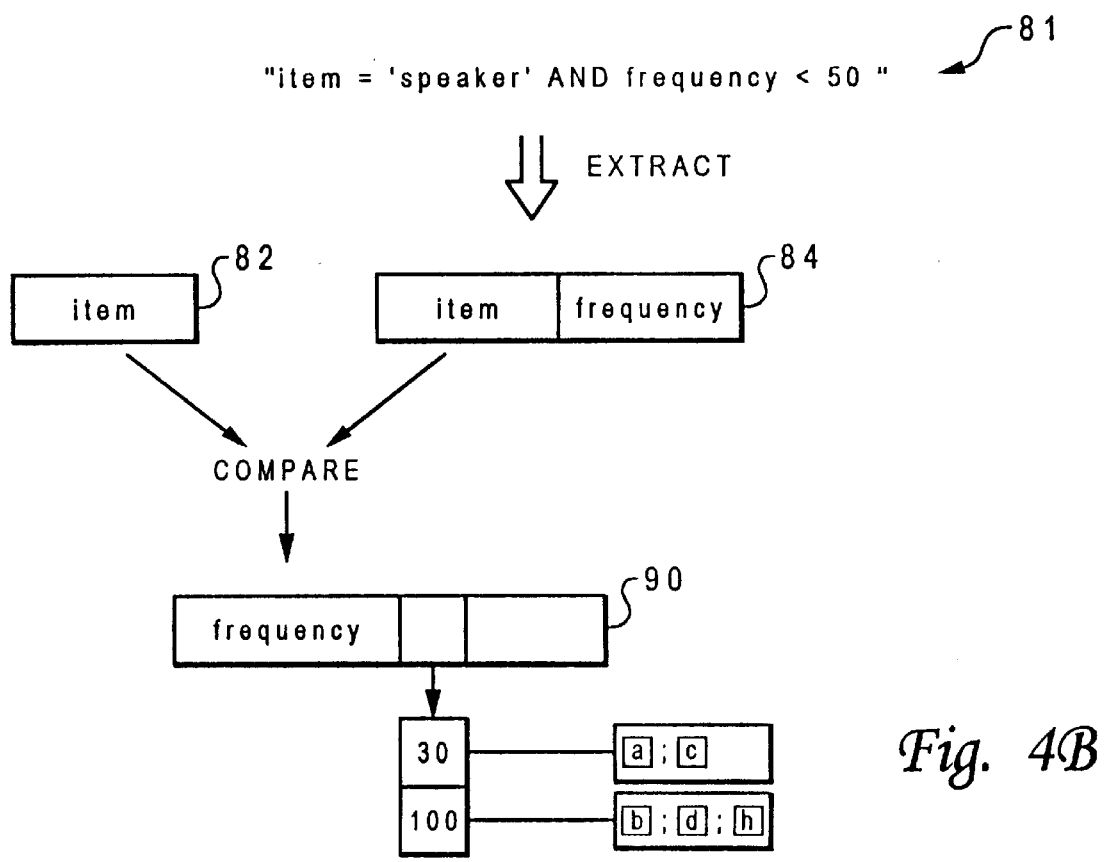
FIG. 4B is a graphical illustration of the preferred steps of the present invention based on the hierarchical naming tree of FIG. 4A.

Referring now to FIG. 4B, there is depicted a graphic illustration of the preferred steps of the present invention based on the hierarchical naming tree of FIG. 4A. For the purpose of illustration, a search expression 81, also shown as follows, is utilized:

"item=='speaker' AND frequency<50"

After traversing search expression 81, a property name list 84 is built. Property name list 84 consists of two property names—item and frequency—that are extracted from the above search expression. After comparing with a permanent index table 82 that is previously built and stored within local node nc1 of the distributed computing network, the property name, item, can be removed from property name list 84 due to its redundancy. Thus, only property name, frequency, is utilized to build a temporary index 90. As mentioned above, the structure of temporary index 90 is similar to that of permanent index 82. In this example, temporary index 90 contains only one property name, frequency. As shown, the property name, frequency, is associated with two property values, 30 and 100. Each of these two property values further corresponds to a binding name path. For property value 30, the binding name from node nc1 is a;c. For property value 100, the binding name from node nc1 is b;d;h. By utilizing temporary index 90, the result of search expression 81 can be obtained. In this example, the result of search expression 81 from node nc1 is the binding name a;c.

As has been described, the present invention supplies an improved method for providing a multiple property searching capability within an object-oriented distributed computing network. By utilizing a permanent index and a temporary index as disclosed, the context database of the distributed computing network is only required to be traversed once. Further, the temporary index may be cached for future usage once it is built. Hence, subsequent searches for frequently searched properties can be performed more efficiently. Although the present invention is intended for incorporating a "yellow pages" feature for a basic Naming Service under CORBA™, the method under the present invention may be utilized in any multiple property searches that are performed within an object-oriented distributed computing network.

While the invention has been particularly shown and described with reference to a preferred embodiment, it will be understood by those skilled in the art that various changes in form and detail may be made therein without departing from the spirit and scope of the invention.

What is claimed is:

1. A method for providing a multiple property searching capability within an object-oriented distributed computing network, said method comprising the steps of:

building a permanent index, wherein said permanent index includes a plurality of property names;

traversing a search expression having at least one property name to form a property name list, wherein said property name list includes all property names specified within said search expression;

removing from said property name list any of said specified property names that also exists in said permanent index;

determining whether or not there is any property name remaining on said property name list; and in response to a determination that there is at least one property name remaining on said property list, building a temporary index for each remaining property name such that subsequent searches for frequently searched properties can be performed more efficiently.

2. The method for providing a multiple property searching capability within an object-oriented distributed computing network according to claim 1, wherein said method further includes a step of performing a predicate evaluation on said search expression.

3. The method for providing a multiple property searching capability within an object-oriented distributed computing network according to claim 1, wherein said removing step further includes a step of comparing property names between said property name list and said permanent index.

4. The method for providing a multiple property searching capability within an object-oriented distributed computing network according to claim 1, wherein said removing step further includes a step of comparing property names between said property name list and said temporary index.

5. The method for providing a multiple property searching capability within an object-oriented distributed computing network according to claim 1, wherein said method further includes a step of parsing said search expression to form an expression tree before said traversing step.

6. A computer program product residing on a computer usable medium for providing a multiple property searching capability within an object-oriented distributed computing network, said computer program product comprising:

program code means for building a permanent index, wherein said permanent index includes a plurality of property names;

program code means for traversing a search expression having at least one property name to form a property name list, wherein said property name list includes all property names specified within said search expression;

program code means for removing from said property list any of said specified property names that also exists in said permanent index;

program code means for determining whether or not there is any property name remaining on said property name list; and program code means for building a temporary index for each remaining property name, in response to a determination that there is at least one property name remaining on said property list.

7. The computer program product residing on a computer usable medium for providing a multiple property searching capability within an object-oriented distributed computing network according to claim 6, wherein said computer program product further includes a program code means for performing a predicate evaluation on said search expression.

8. The computer program product residing on a computer usable medium for providing a multiple property searching capability within an object-oriented distributed computing network according to claim 6, wherein said computer program product further includes a program code means for comparing property names between said property name list and said permanent index.

9. The computer program product residing on a computer usable medium for providing a multiple property searching capability within an object-oriented distributed computing network according to claim 6, wherein said computer program product further includes a program code means for comparing property names between said property name list and said temporary index.

10. The computer program product residing on a computer usable medium for providing a multiple property searching capability within an object-oriented distributed computing network according to claim 6, wherein said computer program product further includes a program code means for parsing said search expression to form an expression tree.

11. A computer system for providing a multiple property searching capability within an object-oriented distributed computing network, said computer system comprising:

a permanent index within said computer system, wherein said permanent index includes a plurality of property names;

means for traversing a search expression which includes at least one property name;

a property name list within said computer system, wherein said property name list includes all property names specified within said search expression;

means for removing from said property name list any of said specified property names that also exists in said permanent index;

means for creating a temporary index, which includes at least one property name that is remaining on said property name list; and means for performing subsequent searches utilizing said permanent index and said temporary index.

12. The computer system for providing a multiple property searching capability within an object-oriented distributed computing network according to claim 11, wherein said computer system further includes a means for determining whether or not there is any property name remaining on said property name list.

13. The computer system for providing a multiple property searching capability within an object-oriented distributed computing network according to claim 11, wherein said computer system further includes a means for performing a predicate evaluation.

14. The computer system for providing a multiple property searching capability within an object-oriented distributed computing network according to claim 11, wherein said compute r system further includes a means for comparing property names between said property name list and said permanent index.

15. The computer system for providing a multiple property searching capability within an object-oriented distributed computing network according to claim 11, wherein said computer system further includes a means for comparing property names between said property name list and said temporary index.

16. The computer system for providing a multiple property searching capability within an object-oriented distributed computing network according to claim 11, wherein said computer system further includes a means for parsing said search expression to form an expression tree.

17. The method for providing a multiple property searching capability within an object-oriented distributed computing network according to claim 2, wherein said performing step further includes a step of producing a new index that is the intersection, non-intersection, or union of two indices in a logical operation.

18. The computer program product residing on a computer usable medium for providing a multiple property searching capability within an object-oriented distributed computing network according to claim 7, wherein said program code means for performing further includes a program code means for producing a new index that is the intersection, non-intersection, or union of two indices in a logical operation.

19. The computer system for providing a multiple property searching capability within an object-oriented distributed computing network according to claim 13, wherein said performing means further includes a means for producing a new index that is the intersection, non-intersection, or union of two indices in a logical operation.

* * * * *